United States Patent [19]
Scott et al.

[11] Patent Number: 5,921,074
[45] Date of Patent: Jul. 13, 1999

[54] PIVOTLESS MECHANICAL CROP HARVESTER

[75] Inventors: Phillip Ray Scott, Coarsegold; Franklin Paul Orlando, Morgan Hill; Dennis Raymond Schultz, Madera, all of Calif.

[73] Assignee: FMC Corporation, Chicago, Ill.

[21] Appl. No.: 08/751,627

[22] Filed: Nov. 18, 1996

[51] Int. Cl.⁶ .................................................. A01D 46/26
[52] U.S. Cl. .......................................... 56/330; 56/340.1
[58] Field of Search ................................... 56/328.1, 331, 56/340.1, 329, 330

[56] References Cited

U.S. PATENT DOCUMENTS

| | | | |
|---|---|---|---|
| 4,286,426 | 9/1981 | Orlando et al. | 56/330 |
| 4,336,682 | 6/1982 | Orlando | 56/330 |
| 4,418,521 | 12/1983 | Orlando et al. | 56/330 |
| 4,432,190 | 2/1984 | Orlando | 56/1 |
| 4,793,128 | 12/1988 | Creed | 56/330 |
| 4,982,558 | 1/1991 | Korthuis | 56/12.6 |
| 5,495,708 | 3/1996 | Scott et al. | 56/329 |

*Primary Examiner*—Heather Shackelford
*Attorney, Agent, or Firm*—Pauley Petersen Kinne & Fejer

[57] ABSTRACT

A self-propelled mechanical harvester for harvesting above ground crops includes a shaker assembly that operates in a single plane. The shaker will oscillate from side to side in the plane without pivoting of the plane around a pivot point. The assembly includes crop contacting rods in one embodiment and crop contacting striker bars in another embodiment. The force used to impart the oscillatory motion to the shaker is supplied by a force balance shaker using two weights operating at the same frequency of rotation, in opposite directions. The weights are timed and maintained in time by a geared relationship to produce maximum force laterally outboard and no force in a direction corresponding to the machine's direction of travel.

20 Claims, 10 Drawing Sheets

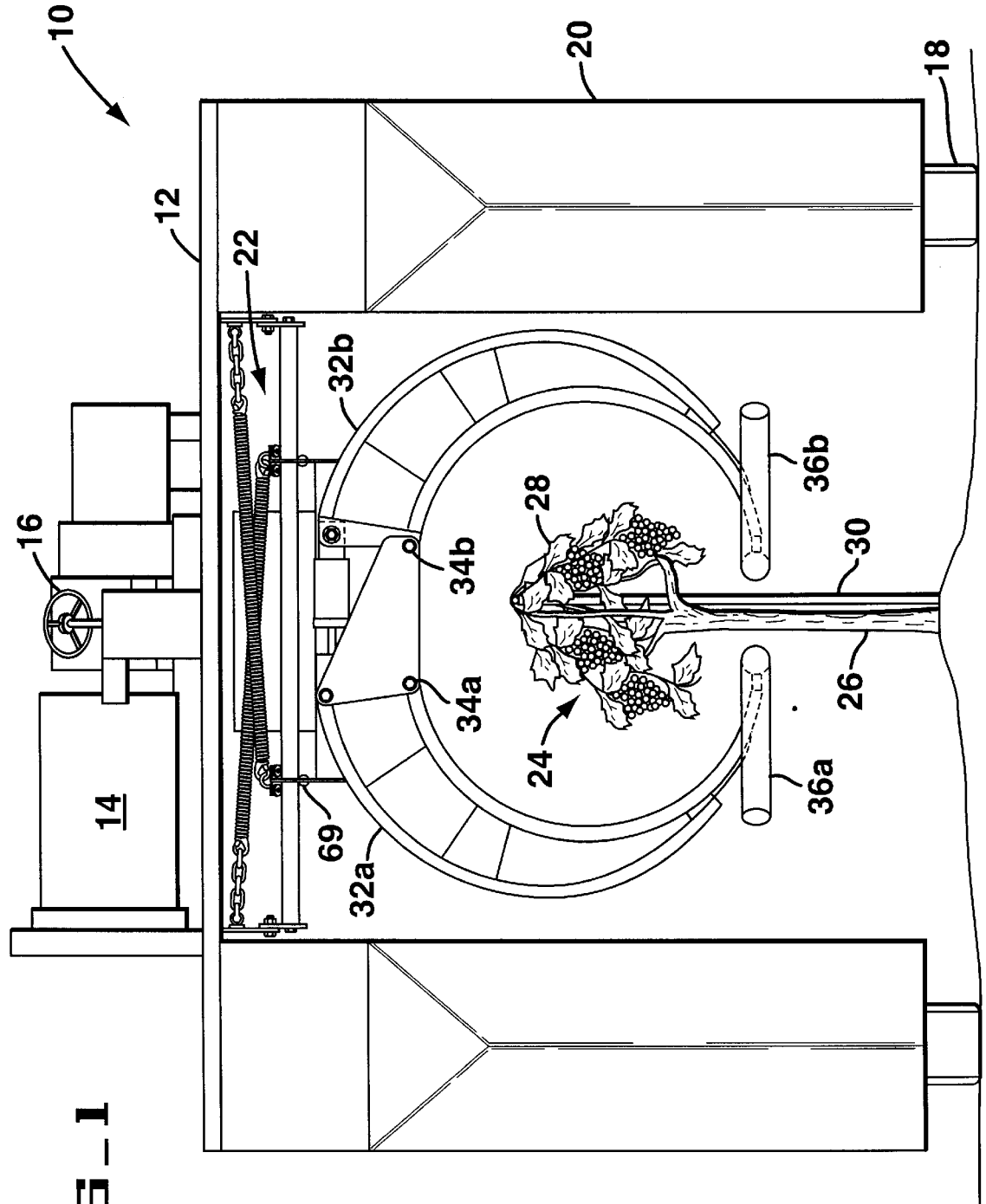
FIG_1

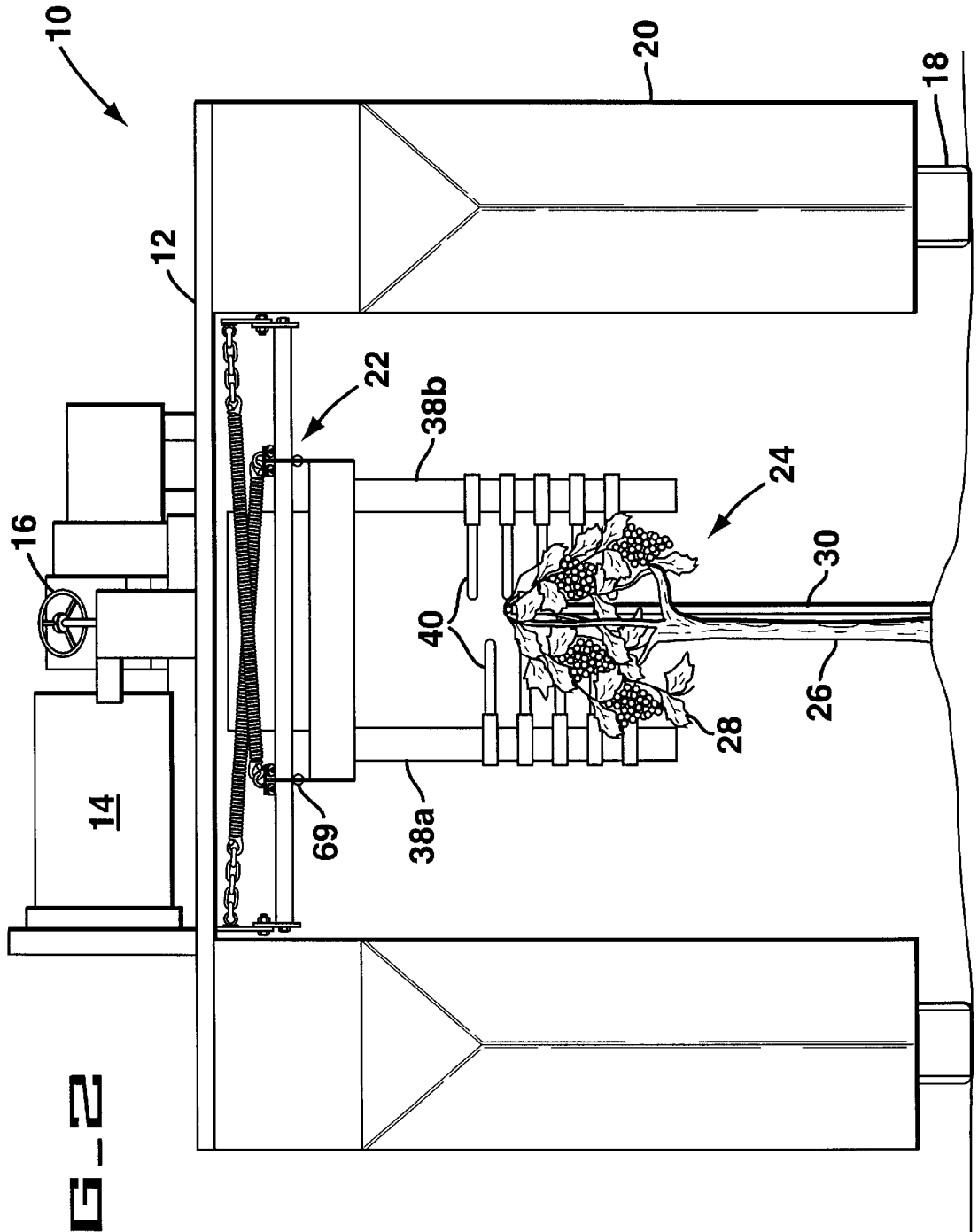
FIG_2

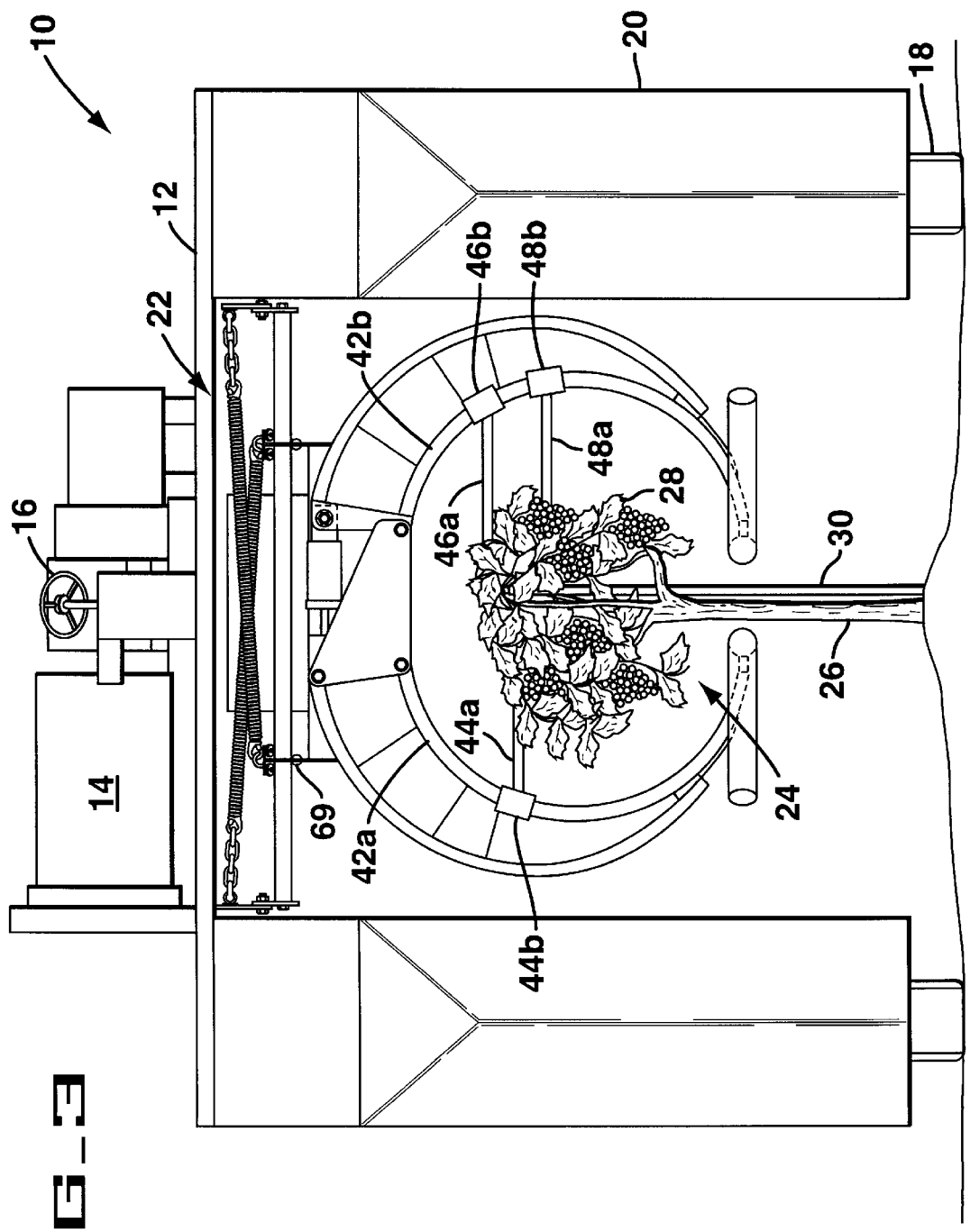
FIG_3

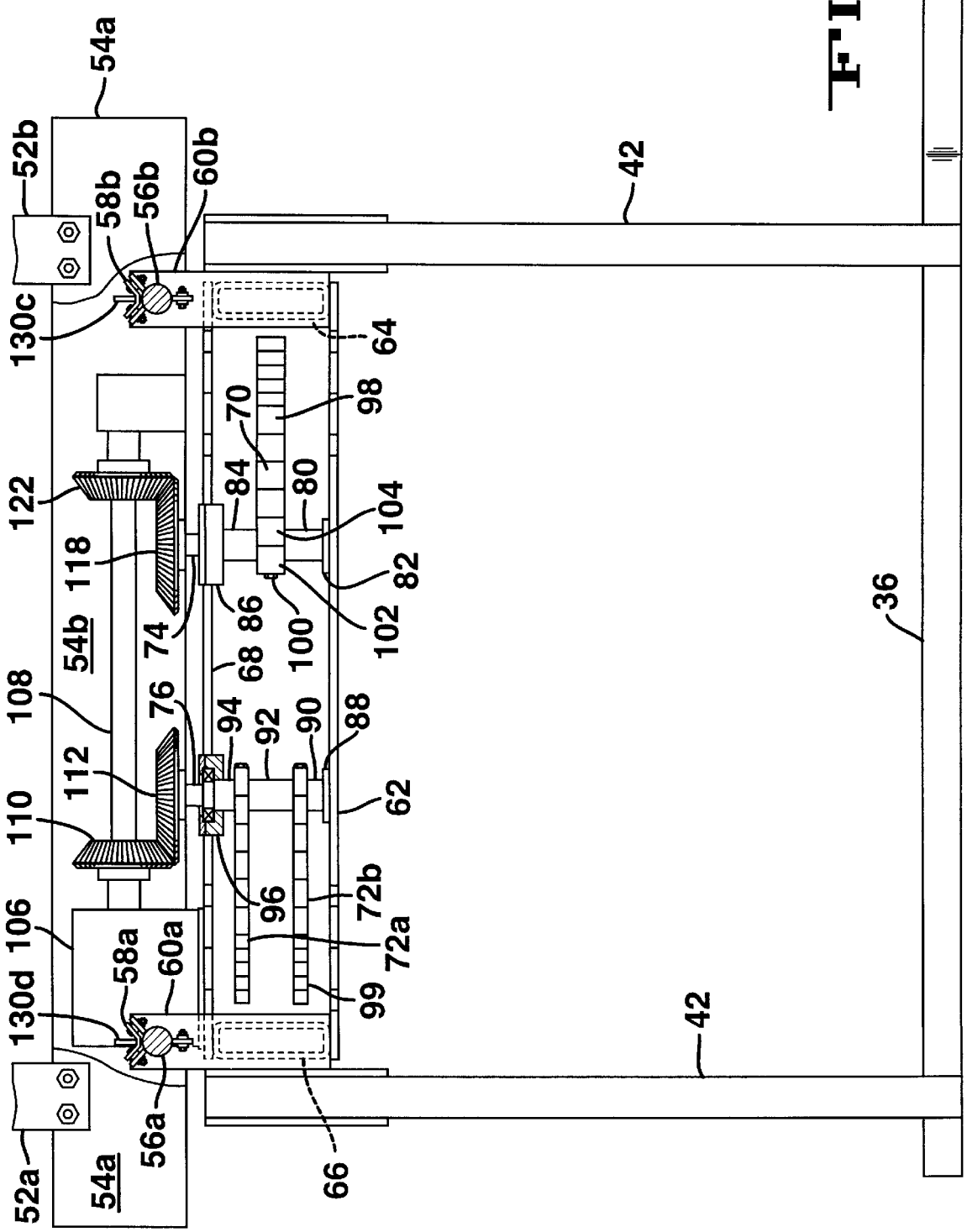

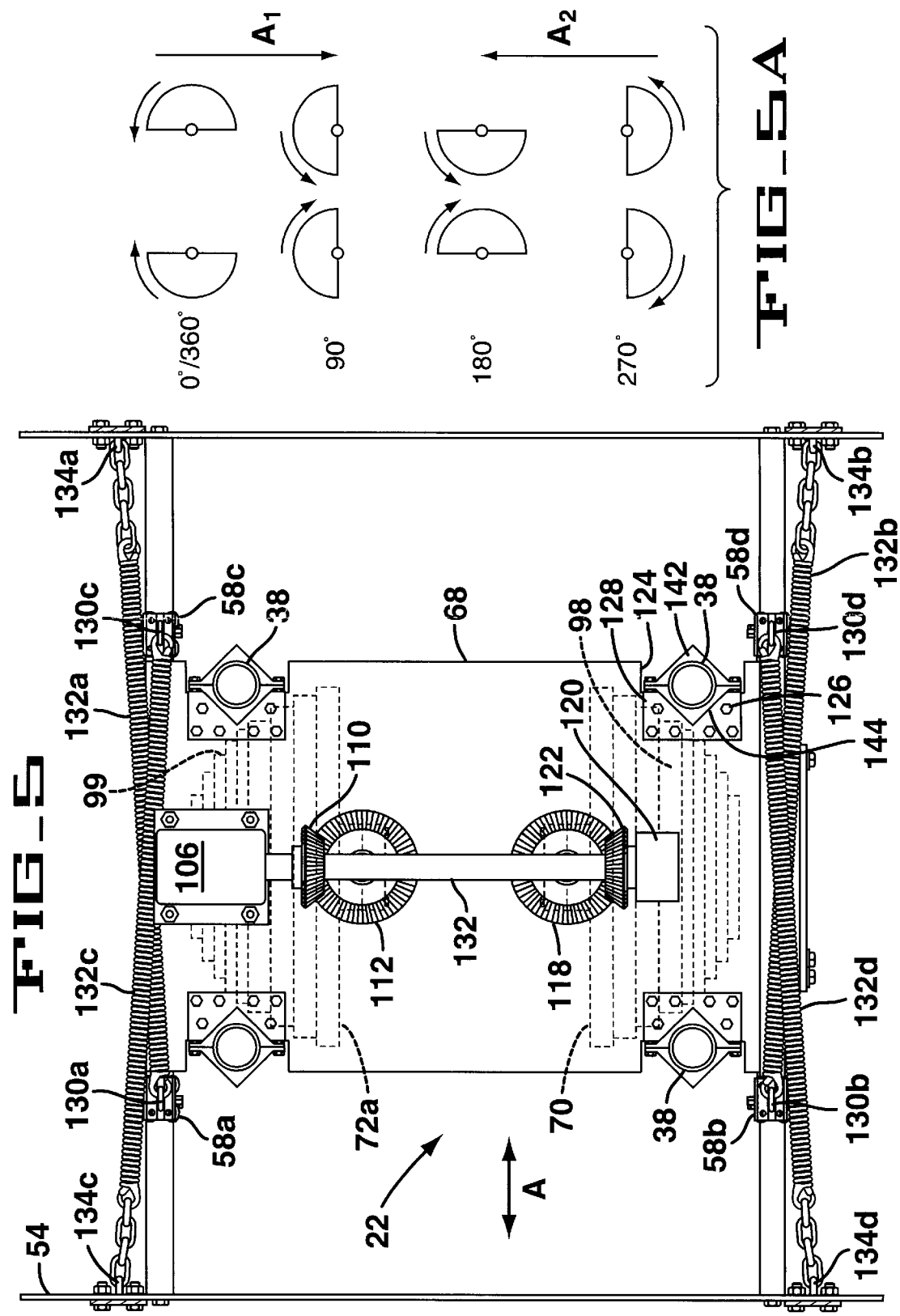

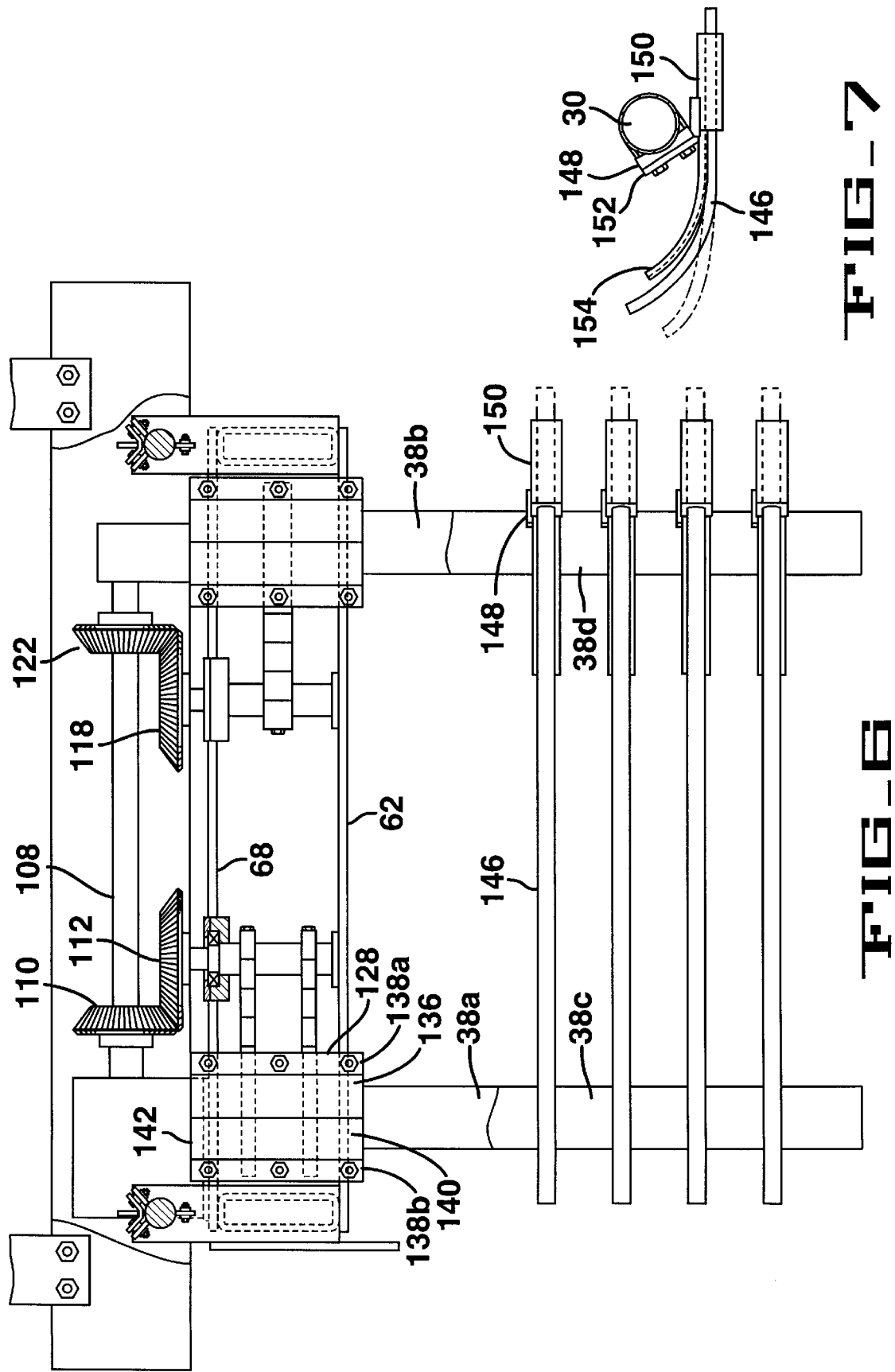

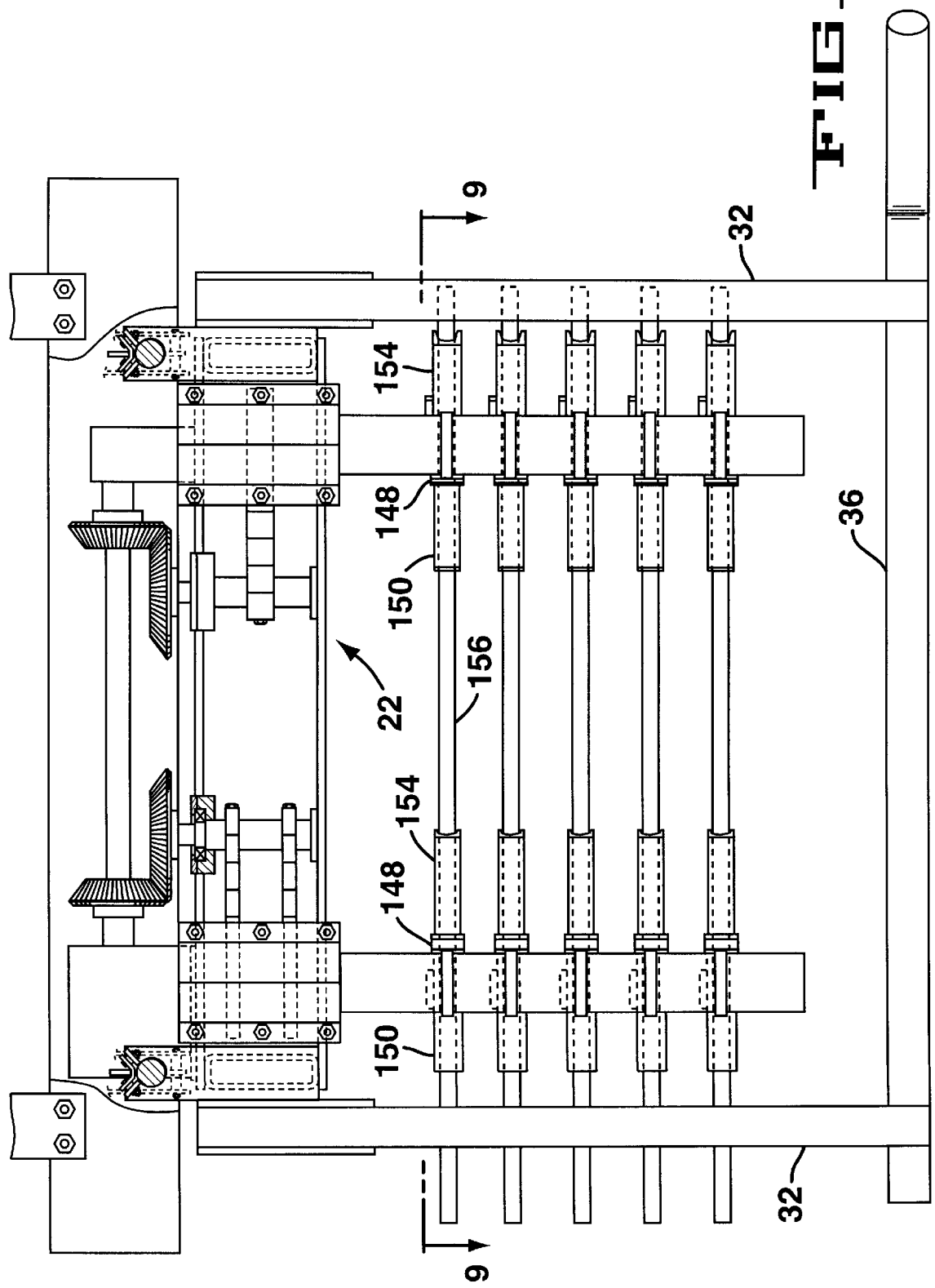

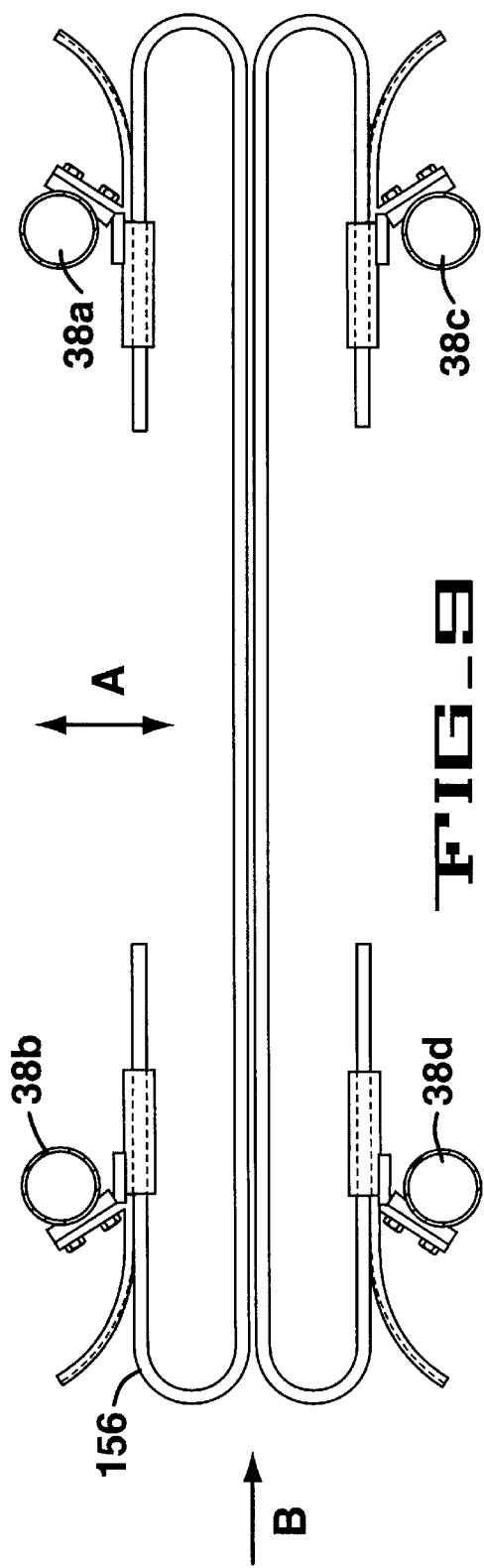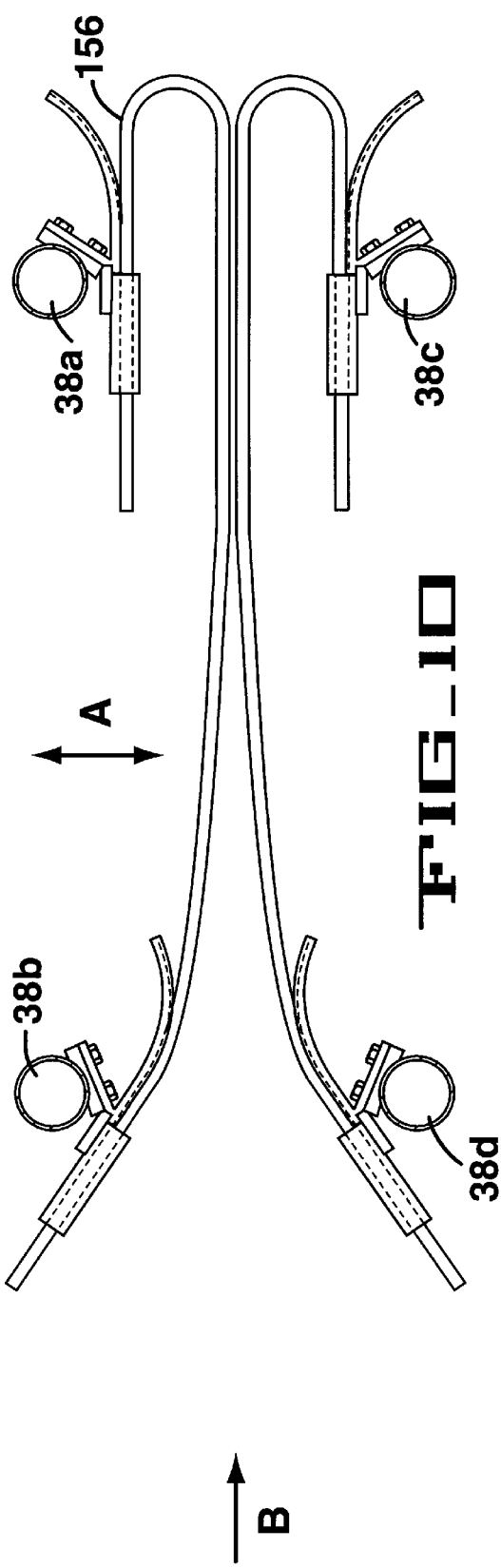

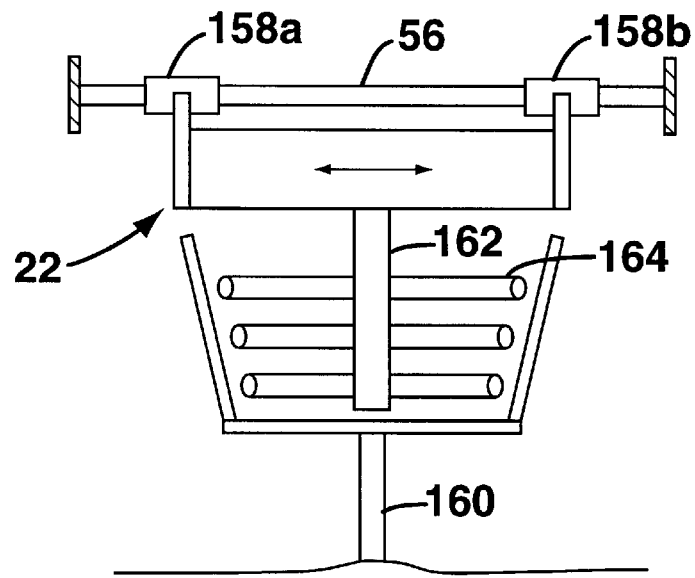
FIG_11
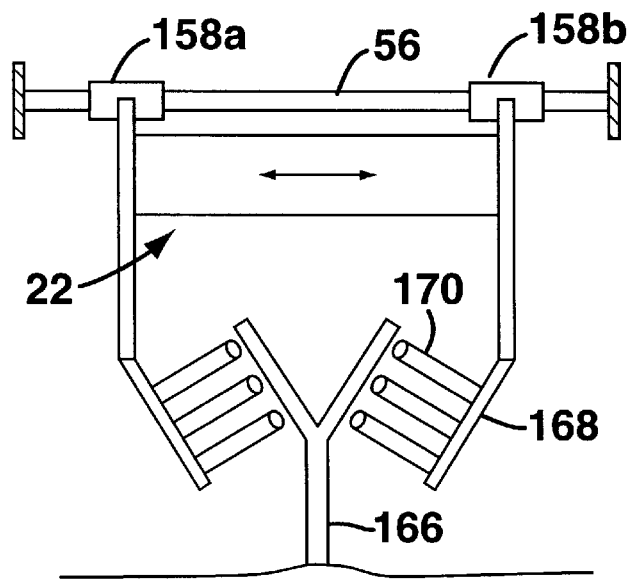
FIG_12

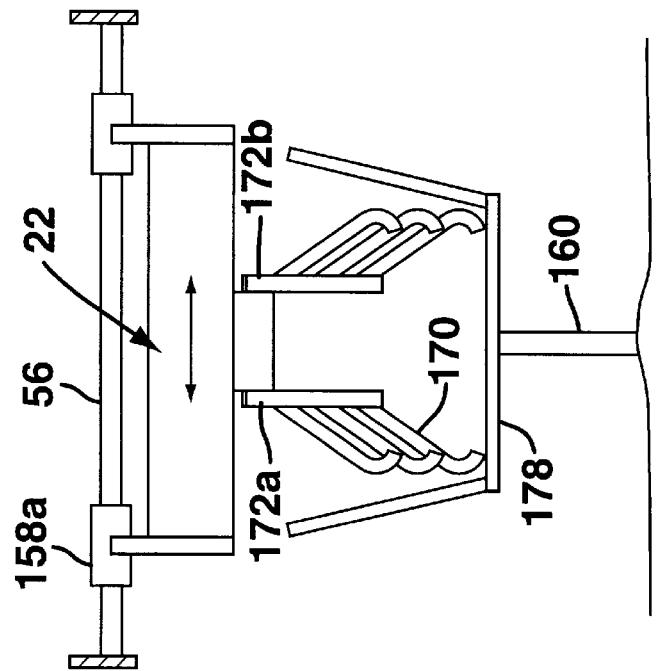
FIG._14
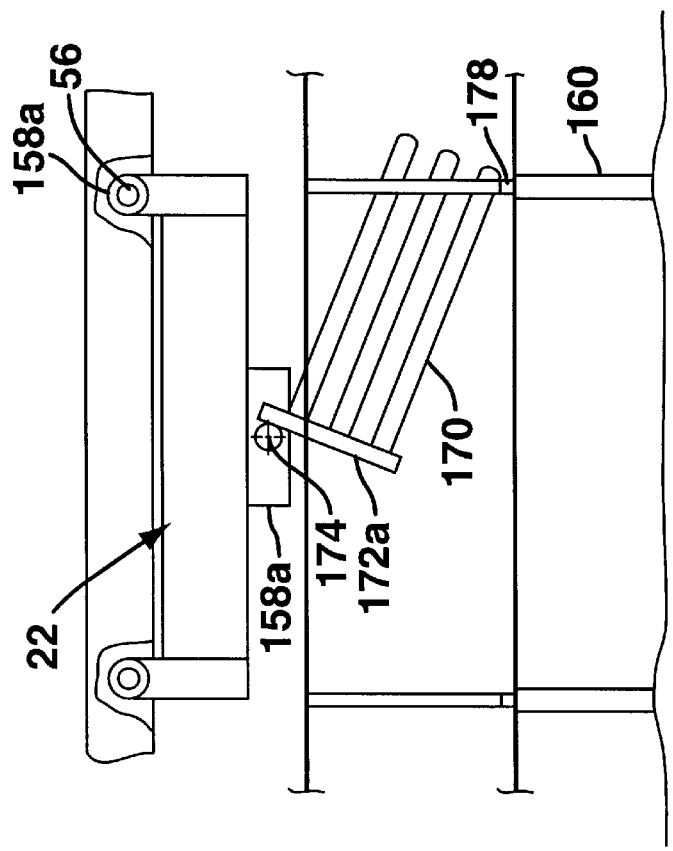
FIG._13

PIVOTLESS MECHANICAL CROP HARVESTER

BACKGROUND OF THE INVENTION

1. Field of the Invention

This invention has to do with propelled mechanical harvesters designed for use in harvesting crops that grow on sturdy vines or on trees. Vine crops include such crops as berry bushes and grape vines. Tree crops harvest able by this invention include fruits and nuts or other similar crops.

More specifically, the invention presented here is a shaker head using a force balanced drive in a unique layout and arrangement that will provide significant force needed to shake product from the plant but will do so without imparting significant vibration to the mobile frame of the harvester itself. The shaking motion of this invention is a side-to-side motion that is naturally directed to a single plane of operation. As the motion of the shaker is directed to this single plane the undesirable lost motion of a multi plane or pivoting shaker head is eliminated.

2. Description of the Prior Art

The mechanical harvesting of vine products, such as grapes, is a tumultuous industry that has seen numerous developments in recent years. No mechanical harvester manufacturer has come up with the "be all and end all" machine that dominates the market. Advancements occur sporadically and with the cyclical harvest schedule the advances in the art are taken in a stepped progression rather then a smooth evolution.

General information regarding harvesters of the type described herein, it being noted that these harvesters rely on a pivoting head and shaker motion, can be gleaned from a perusal of U.S. Pat. Nos. 4,286,426 for a "Vibratory Fruit Harvester"; 4,336,682 for a "Continuous Harvester For Plants Grown in Rows"; 4,432,190 for a "Continuous Harvester For Plants Grown in Rows"; and 5,495,708 for a "Canopy Harvester With Force Balanced Drive." The references cited in these patents will also be of interest in gaining knowledge of the vibratory harvester industry.

U.S. Pat. No. 4,793,128 to Creed for a Horizontal Force Balanced Shaker and Method presents an embodiment of shaker that includes a force balance shaker driving a parallelogram-type translation function. This device does not have the horizontal bars that are used in the instant invention and assure the horizontal movement of the shaker bars. The Creed shaker has a complex drive system used to get equal force at each end of the shaker. It also has an upward vector in the travel of the bars due to the parallelogram linkage.

A U.S. Patent entitled "Counterweight Method and System for a Beater Rod of a Harvester," Number 4,982,558, shows the use of counter rotating weights in a vertical harvesting system.

Up until about fifteen years ago mechanical harvesting of grapes was rare and some of the most important and astute growers and farmers were hesitant to harvest using mechanical means due to perceived damage to crops. It has taken many years and equipment iterations to convince the sophisticated growers in the industry that mechanical harvesting was a safe means of bringing in the crop. Some growers believed vine damage from use of what are know as foliage shakers were too hard on the crop. Damage to canes, leaves and new bud growth, not to mention the volume of leaves and "trash" picked with the grapes, was not tolerable and the industry turned to stump shakers that allowed mechanical harvesting without damage to the foliage mass.

SUMMARY OF THE INVENTION

As stated above, the mechanical harvester presented here is a shaker type harvester that has elements that interface with the living plant to shake it at a frequency and amplitude sufficient to cause the fruit of the plant to break loose and be recovered. The central theme of the shaker is that the motion of the shaker head is side-to-side relative to the direction of travel of the propelled harvester. This is accomplished through the use of what has become to be known in the industry as a "force balanced shaker." The shaker used herein has a set of counter-rotating eccentric weights running at a common frequency. The shaker head will traverse from side-to-side on a pair of guide rails in response to the position of the weights. Attached to and extending generally downward from the main body portion of the shaker head will be either a set of posts for accommodating foliage shaker apparatus (rods and rod holders) or in another embodiment, a pair of curved arms to which a pair of trunk contacting bars will be attached. Another embodiment of the invention provides for the use of both the foliage shaker and the trunk shaker apparatus on the same shaker head simultaneously which will provide harvesting efficiencies better then either single shaker type in the appropriate crop. Grape harvesting may provide a good candidate for such a hybrid unit.

Expanding on this, the shaker head will normally be equipped with one of at least two possible plant contacting elements. Either a trunk shaker device will be attached to the shaker head or a foliage shaker will be attached to the head. Some growers have found however that certain type of plants lend themselves better to being harvested by one type of shaker apparatus. For instance, grape vines pruned in cordon style with the foliage arranged in a vertical pattern are efficiently harvested using a trunk shaker. Cane pruned vines where the foliage may be broadly distributed above the vine trunk will be harvested better with a foliage shaker. This provides a dilemma for the grower who grows both cordon pruned and cane pruned vines. He will want to change from one style to the other style shaker head to match the crop being harvested. This "change over" was usually done at a local equipment supply and repair shop as there were major components to change and adjustments to be made. One of the advantages of this invention is that the grower himself can do the "change over" as there are fewer components to change and virtually no power adjustments to be made to the drive of the shaker head. The change can be done quickly thus not squandering the window of time available to pick the crop at the most opportune time.

The vibratory motion of this shaker head is constrained to a single, generally horizontal, plane. In current harvesters the vibratory motion is directed through a pivot point on the shaker head and therefore there is always a force vector component in a plane other then the plane needed in the picking of the crop. This extraneous force vector component will be directed into the host vehicle supporting the shaker head and will cause serious vibration in the host vehicle. Inherent imbalance means that machine designs had to be heavily over built, sometimes by adding special parts such as flywheels or counterweights, to accommodate or reduce the inherent imbalance. The inherent balance of the instant invention provides the advantage of not having to over build and not having to add extra parts to smooth out the operation of the machine, it is inherently vibration free (relative to the machines known in today's market). This also results in a cost savings to the grower in that the initial cost of the head can be lower and the rate of part replacement can be significantly reduced as there is no violent vibration to contend with in the shaker head and the host vehicle. Furthermore, having a harvester break down during the limited time available to harvest can be devastating. With a smoother machine the field break downs due to vibration will be non-existent thus saving the harvesting window for actual harvesting.

One other advantage of this invention is that the new shaker head eliminates the need for expensive universal joints, large bearings and sophisticated housing casings. This is accomplished through the use of the simple force balanced shaker set to operate in a single plane without the need for a pivot point in the shaker head.

A somewhat subjective belief regarding the possible damage to grape vines when using a contemporary trunk shaker is that the "scuffing" or "scrubbing" motion that is inherent with the pivoting trunk is relieved by the straight on point of contact possible with the instant shaker. Since the shaker head moves in only one plane the trunk striker bars will also move in a single plane with no vertical component in the strike. This is thought to reduce "scuffing" and "scrubbing" and be somewhat less violent to the trunk of the plant.

A final object of the invention is to provide a shaker head that is a productivity improvement over current shakers.

BRIEF DESCRIPTION OF THE DRAWINGS

A specific embodiment of the invention will now be described by way of example with reference to the accompanying drawings in which:

FIG. 1 is a head-on elevation view of a trunk shaker crop harvester;

FIG. 2 is a head-on elevation view of a foliage shaking crop harvester;

FIG. 3 is a head-on view of a combination foliage and trunk shaking crop harvester;

FIG. 4 is a partially sectioned view of a shaker head and a trunk shaker type crop harvester;

FIG. 5 is a top view of a shaker head of the invention;

FIG. 5a is a graphical presentation of the weight rotation progression;

FIG. 6 is an illustration of a shaker head in elevation with some parts sectioned or removed;

FIG. 7 is a view showing a shaker rod attached to a shaker post;

FIG. 8 is an alternative embodiment of the invention;

FIG. 9 is a representation of a shaker rod configuration;

FIG. 10 is a representation of another shaker rod configuration;

FIG. 11 is an embodiment of the invention for use with lyre trellis trained crops;

FIG. 12 is an embodiment of the invention for use with "Y-shape" trellis trained crops;

FIG. 13 is another embodiment of the invention with a pivoting attachment of shaker rods;

FIG. 14 is a front elevation view of the embodiment shown in FIG. 13.

DESCRIPTION OF THE PREFERRED EMBODIMENT

FIG. 1 shows an embodiment of the invention as a trunk shaker style harvester generally 10. The harvester is presented as a stripped down vehicle to primarily show the general environment in which the shaker proper will reside. Detail structure of the harvester, as a host for the shaker head generally 22, is not thought necessary for a complete understanding of the invention as the invention resides in the head and the attachments.

General information regarding harvesters of the type described herein can be gleaned from a perusal of U.S. Pat. NMOS. 4,286,426 for a "Vibratory Fruit Harvester"; 4,336,682 for a "Continuous Harvester For Plants Grown in Rows"; U.S. Pat. No. 4,432,190 for a "Continuous Harvester For Plants Grown in Rows"; and U.S. Pat. No. 5,495,708 for a "Canopy Harvester With Force Balanced Drive." The references cited in these patents will also be of interest in gaining knowledge of the vibratory harvester industry.

The vehicle, shown also in FIGS. 2 and 3, in which like numbers represent like parts, includes a frame 12. The frame supports a prime mover 14, a driver's station 16, and various other storage tanks, hydraulic pumps, drive components, and controls. The entire harvester generally 10 is supported on ground engaging wheels such as 18 partially hidden behind fenders such as 20.

The object to be harvested is fruit from a plant having above ground fruit such as the grape vine generally 24. Berry plants and bushes, fruit trees, nut trees, and other sturdy upright crops could be harvested by this type of harvester; however, in this specification, the harvesting of grapes will be discussed as an example of one harvesting operation that could advantageously be undertaken through the use of the invention.

The grape vine, generally 24, has a trunk 26 and foliage 28. The foliage includes canes of the plant, more mature branches, leaves, and the fruit. A post or pole 30 provides support for the stringers or wires strung between successive posts upon which the grape vines are supported. The post 30, in FIG. 1, appears to be adjacent the trunk 26 but would be located somewhat behind the plant in this figure and between subsequent plants in the vineyard.

Each of the FIGS. 1–3 share a common shaker head generally 22 with the difference being in the apparatus attached to the shaker head. FIG. 1 shows a "C-arm" style trunk shaker that is designed to remove fruit from vines by shaking the trunk 26 of the plant. Arms 32a and 32b are carried directly to the shaker head at attachment points 34a and 34b. These arms are substantially built structures that can take and deliver significant force translations necessary in impacting the trunk 26. They are curved to circumvent the canopy of the plant and position striker bars 36a and 36b proximate to the trunk. The details of this structure will be discussed further on in this specification.

FIG. 2 is the same general harvester 10 as shown in FIG. 1. The shaker head, generally 22, is the same as the FIG. 1 embodiment with the difference in the picking mechanism attached to the shaker head. This embodiment is designed to pick the grapes by shaking the mass of foliage 28 without resort to the use of the trunk shaking apparatus of FIG. 1. In this embodiment a series of posts, normally four, two shown as 38a and 38b, are fixedly attached using fasteners or nut-and-bolt connections to the shaker head proper. A series of picking rods, such as 40, which could be of any one of many styles, are fastened, again a nut-and-bolt connection provides good adjustability advantages, to the posts 38. The picking rods, such as 40, will contact the foliage and get it oscillating causing the fruit to be vibrated off the plant as is the function of a grape harvester. The motion imported to the rods will be a result of the shaker head motion, as will be described later.

FIG. 3 shows the generic harvester vehicle generally 10 again. This vehicle hosts the shaker head generally 22 as in FIGS. 1 and 2 but shows the mounting of a hybrid or combination of shaker head attachments. This hybrid unit has C-arms 42a and 42b which are identical to those shown in FIG. 1 except for the attachment of rods such as 44a, 46a, and 48a to the C-arms 42a and 42b. These rods 44a, 46a, and 48a would be rods that are attached to the mounts, 44b, 46b, and 48b at one end. The aft end of these rods would be attached to the C-arms at the trailing end of the shaker head in a similar manner. Alternatively, arms being attached to only one of each of the C-arms would be possible and these rods would not be attached to anything at the other end of the rods-they would be so called "slapper rods."

The striker bars 36a and 36b would be the same in this embodiment as the striker bars in FIG. 1.

FIGS. 4 and 5 are directed to the mechanism of the shaker head itself. This explanation refers to both drawings with regards to the shaker head, generally 22, even though the attachments to each head are different-FIG. 4 shows the C-arms 42 and the striker bar 36. FIG. 5 shows the posts 38 of the foliage style apparatus.

Starting with FIG. 4, a pair of longitudinal hanger plates 54a and 54b are suspended by means of hanger plate mounts such as 52a and 52b which are attached to the frame of the harvester vehicle. The foreground longitudinal hanger plate 54a is partially removed to show more detail on the shaker head and thus the background longitudinal hanger plate 54b is shown. These hanger plates provide mounting locations for transverse rods 56a and 56b which are mounted between the longitudinal hanger plates generally perpendicular to them and perpendicular to the normal direction of travel and to the centerline of the harvester.

The shaker head is supported on these transverse rods by means of the cam roller sets 58a and 58b. These cam roller sets, and there are four sets in the usual shaker head, are integral with support flanges 60a and 60b (there are four of these as well). The support flanges support the shaker head through welded connections to the shaker head module. This module includes a lower shaker module plate 62, first 64 and second 66 box beams and an upper shaker module plate 68. These are the structural elements supporting the drive mechanism, the excitation mechanism and the selected shaker apparatus associated with the shaker head.

Turning back to FIGS. 1, 2 and 3 for a moment, it should be pointed out that a guidance cam roller, such as 69, is carried below the sets of cam rollers on the top of the transverse rods. The guidance cam rollers are attached to the same support as the cam rollers on the top of the Transverse bars.

A set of counter rotating weights 70 and 72a and 72b are carried on vertical shafts 74 and 76 respectively. A spacer 80 spaces the first weight 70 a distance from a bearing and/or a thrust bushing 82 and a second spacer 84 spaces the first weight from bearing 86. Bearing 86 is the same as bearing 96.

Weights 72a and 72b are carried on vertical drive shaft 76. The second weight 72b of the weight set is spaced away from a bearing and/or thrust bushing 88 by a spacer 90. A second spacer 92 separates the second weight 72b from the third weight 72a. Spacer 94 separates the third weight from the bearing 96.

The three counter weights are divided into two weight sets. Weight 70 represents one set of weights and weights 72a and 72b represent a second set. Both sets of weights have the same mass, which is adjustable by adding or subtracting weight components such as individual weights 98 and 99. The individual weights are individual weights that are stacked together and fastened with long through bolts such as 100 and nuts or threaded weights which hold the weight set together. This modular construction of the weight sets gives the machine operator the flexibility in adding or subtracting weight from the set as needed to effect the force generation as the weights are rotated with the shafts 74 and 76.

The weight set through bolts 100, and there will be at least two per weight set, serve a purpose of also attaching the weight sets to the vertical shafts 74 and 76 by clamping the shafts securely by means of caps 102 and 104.

The drive motor 106 for the shaker head will have an input shaft 108 driving a first pinion gear 110 which will drive a first ring gear 112 in a first direction. The first ring gear 112 is connected to the first vertical shaft 76 which will be driven in a first direction. A second pinion gear will turn in a direction opposite the first pinion gear and turn a second ring gear 118 in a direction opposite the direction of the first ring gear 112 and the first vertical shaft 76.

This arrangement of counter rotating gears and shafts will of course cause the weights 70 and 72a and 72b to counter rotate as well. This weight counter rotation will be timed by the gear sets connected to the vertical shafts so that the weights will rotate in synchronization with each other. The weights are initially set to have their individual centers of gravity intersecting the same vertical plane at zero degrees of rotation, one hundred and eighty degrees of rotation and three hundred sixty degrees of rotation. FIG. 5a is instructive in showing the normal rotation of the weights in a representative pictograph. In the actual preferred embodiment the weights would have their centers closer together and the weights would enter the swept zone of each other but would not collide due to the separation of weight 72a and 72b into two components with weight 70 passing between weights 72a and 72b.

The weights, 70 and 72a made up of individual weights such as 98 and 99, can be seen in broken line representations in FIG. 5. This figure is slightly different from the FIG. 4 view in that it is a shaker head to which posts 38 have been attached instead of the C-arms shown in FIG. 4. Also this version of the shaker head includes a representation of a tachometer 120 that receives an input from a second pinion gear 122 in contact with the second ring gear 118. However, for the purpose of the description of the shaker head these differences are unimportant. It is expected, however, that the tachometer installation would be part of the production embodiment of the invention.

In this FIG. 5 the upper shaker module plate 68 is shown with the motor 106 attached to it. Just inboard of the four corners of the top plate, and this goes for the bottom plate as well, are rectangular cutouts such as 124. Inboard of these cutouts will be a plurality of through bores for accepting a number of bolts such as 126 which are provided to accommodate post hangers 128. The cam roller sets, 58a and 58b above and including 58c and 58d here, are connected to the first and the second box beams which are hidden from view in this figure. Rings 130a, b, c and d attached to the cam roller supports provide the mounting locations for the ungrounded ends of springs 132a, b, c and d. (These springs were left off FIG. 4 for purposes of clarity but would be used in any of the sets of harvester tool selections made for a particular crop.) Each of these springs would be grounded to the longitudinal hanger plates, springs 132c and 132d being attached to grounding brackets 134c and 134c respectively, and springs 132a and 132b being attached to grounding brackets 134a and 134b respectively. These four springs are provided to center the shaker head in the harvester to a position where it is carried with a centerline drawn through the weight supporting shafts lined up on the centerline of the harvester. (This description of location is for illustration only, obviously the shafts could be offset from the machine centerline, even at right angles thereto. The side-to-side direction of force would be maintained however due to weight set up, position and timing.)

The shaker head, generally 22, will be able to move transversely in the direction of arrow A, the side-to-side motion of the shaker head against the spring tension of the first set of springs 132*a* and 132*b* while relaxing the tension in the other set of springs 132*c* and 132*d* and vice-versa as the shaker head direction is revesed.

The eccentric weight sets; 70, 72*a* and 72*b*; 72*a* and 72*b* taken as a weight set, are equal in WR, the amount of weight times the radius out to the center of mass of the weight. The sets will operate opposite each other and they are timed relative to each other such that the force generated by each weight set is added to each other in the desired direction of shaker head travel-side-to-side relative to the row being picked. In any other direction of force, a direction not conducive to the side-to-side direction desired, the weight sets will balance each other exactly. While the embodiments here show one weight on one shaft and two weights on the other shaft, the two weights 72*a* and 72*b*, add up to be identical to the single weight 70.

As mentioned above the individual weight elements such as 98 and 99 are bar weights laid one on top of another and bolted together. Alternatively, lead shot in a hollow weight or other methods could be used-for instance, non-adjustable flame cut weight plates could be used. It should be pointed out however that reducing the WR reduces the length of movement or stroke of the shaker head from side-to-side. Increasing WR increases stroke and makes the shaker head more aggressive.

Returning to FIG. 5, and FIG. 5*a*, the motion in the direction of arrow A can be envisioned. As the weights are driven they will of course generate a force. When both weights cross the horizontal plane, defined by a plane drawn through the center point of the axles of each weight, they will be accelerating the shaker head in the direction opposite the direction of the direction of the center of mass of each weight, i,e., in the direction of arrows $A_1$ and $A_2$ in FIG. 5A. When the weights are ninety degrees into a rotation they will produce maximum force and the shaker head will be at virtually its maximum travel and force for each frequency setting. The force on the shaker head being directed as well to the accessory picking elements attached to the shaker head. As the weights go through ninety-one to two hundred seventy degrees of rotation the force will build in the "upward" direction until again reaching its theoretical peak force at two hundred and seventy degrees of rotation for the second time in one complete cycle. At that point the shaker head will have traversed the stroke length of the device on the transverse rods 56*a* and 56*b* from one side extreme to the other side extreme. In operation the process will be repeated at the frequency determined by the operator but in the range of between two hundred fifty and four hundred cycles per minute. No upper or lower limits to the frequency are being identified however the machine will be designed to operate in the range set out above. The forces generated when the weights are in the ninety degree position and the two hundred seventy degree position as shown in FIG. 5*a* are the forces desired to propel the shaker head laterally on the harvester. Forces will build as the weights approach the maximum displacement from the vertical plane defined by a plane drawn through the vertical centerline of the vertical shafts and after traversing that point the forces will build in the opposite direction.

Although a gear driven drive embodiment is shown the inventor contemplates other arrangements that will turn the shafts, 74 and 76 in opposite directions. For instance, independent hydraulic motors could be used to drive each shaft. A cogged belt, having inside and outside cog surfaces could be used. A set of four spur gears could be used. The possibilities are myriad and extensive.

Now that the shaker head has been described some details of the accessories for picking, shaking, or harvesting that could be attached to the head will be described. In FIG. 6 attention should be drawn to item 128, one of two post hangers shown in this figure and one of four post hangers attached to the shaker head when posts are attached. Each post hanger 128 has an exterior plate structure 136 having bolt receiving flange portions 138*a* and 138*b* connected to each other bridged by an "angled out" portion 140 of the exterior plate 136. Welded to the inboard side of the "angled out" section are four flanges, one a top flange, shown generally as 142 in FIG. 5. The top flange 142 is at the top of the exterior plate 136. A second flange (not shown) is welded to the interior of the "angled out" section about one inch below the top flange. A bottom flange (not shown) is welded near the bottom of the "angled out" section and a fourth flange is welded in position about an inch above that. The flanges have cutouts having a radius close to the radius of the pipes 30 they will hold.

The outboard exterior plate structure 136 is duplicated by a similar interior plate structure 144 in FIG. 5. The interior plate structures also include means to attach it to the upper and lower shaker module plates 68 and 62, respectively. The means is a pair of perforated plates or post hangers 128 welded to the backside of the interior plate structure. These post hangers will hold the posts 38 in place by clamping around blocks of elastomer having a post size hole through them that are carried between the top flange and the flange one inch inboard of it and between the bottom flange and the flange one inch inboard of it. These elastomeric blocks, typically four per post with two blocks at the upper end of the clamp and two at the lower end of the clamps, could be one inch or more thick, the thickness of the blocks determined by the holding force necessary to restrain the posts 38. An advantage of this clamping design is that the posts can be easily adjusted up or down in the clamping device while the whole post can be easily removed by removing the fasteners holding the clamping device to the upper and lower shaker module plates.

The posts 38 in FIG. 6 support picker rods such as 146 in FIG. 6. The picker rods 146 shown are mounted by means of muffler clamp arrangement 148 in FIG. 7. The muffler clamp arrangement will include an attached tube 150 offset from the clamp base 152. The rod 146 will be inserted into the tube 150 and secured by means of adhesive, set screws, through bolts, or a press fit. A rod stiffness enhancer 154 may be included as part of the clamp assembly. This will provide a stiffening means to allow adjustment of rod force. As the rod 146 in the dotted line position in FIG. 7 is spaced away from the stiffener it will have a lower force. As the clamp 148 is rotated counterclockwise in this figure such that more of the length of the rod 146 contacts the stiffener the stiffness of the rod 146 as the midpoint or downstream section of the rod will become more stiff.

FIG. 6 conceptually presents two embodiments of rod 146 arrangements. Rods could be mounted to two leading posts, such as 38b and 38d, which would be the posts forward on the shaker head as the harvester moves down a row. The second set of posts 38a and 38c could be dismounted from the shaker head, however for assistance in maintaining force balance in the shaker head they would normally be left in place. With them in place they may as well be equipped with rods such as 146 mounted just as mounted to the posts 38d and 38b. They have been left out of FIG. 6 for clarity.

Alternately the rods 146 could be attached to the forward set of posts 38a and 38c as is shown in FIG. 8. Looking at FIGS. 8, 9 and 10, ignoring for the moment the presence of C-arms 32 and the striker bar 36, embodiments of what are know in the industry as "Bo-Peep" rods such as 154 are shown. In these figures it can be seen how the rods, clamping elements and stiffness enhancers 154 would be arranged. As the rods and posts 156 and 38 respectively move side-to-side in directions represented by arrow A with the shaker head module the crop will enter the bight between the rods in the direction of arrow B. For foliage contact harvesting, the purpose of these Bo Peep rods, the rods will contact the foliage mass and impart the force necessary to dislodge grapes from the vine for example. Rod to foliage harvester techniques are known in the industry, what is not known is the pivotless shaker head technique which gives the rods the side-to-side shaker action possible only with the above disclosed shaker head.

FIG. 8 shows C-arms and a striker bar 36 attached to the shaker head module generally 22. This hybrid combination represents an alternative configuration that has both the trunk striker bars and the shaker rods. Although FIG. 8 represents an extreme situation it is a possible combination as the motion of the striker bars and the motion of the shaker rods will all be operating in a single plane as they follow the side-to-side transverse motion of the shaker head 22.

FIGS. 11 and 12 are pictorial representations of alternative embodiments recognized as desirable by the inventors. The shaker head module generally 22, is carried on transverse rods, one shown as 56. A first difference here is that the shaker head is bushings carried on the rods or more complicated roller bearings sliding devices. This structure is an alternative to the cam rollers structures already described and may be equally desirable.

In FIG. 11 lyre trellis, sometimes used in the growing of grapes, is shown as 160. To harvest a crop from this style trellis it would be good to have the posts supported on the sleeve bearings or bushings 158a and 158b. These can be simple such as the single centrally mounted post 162 with its attached shaker rods such as 164 attached thereto and vibrating side-to-side in between the upstanding portion of the trellis.

FIG. 12 shows a shaker head designed to shake product from the vines grown on a "Y-shaped" trellis 166. The shaker head module will be as described above with posts such as 168 and rods such as 170 arranged at a desirable angle to contact the mass of vines on the trellis and vibrate them to harvest the fruit.

FIGS. 13 and 14 present another embodiment, in a pictorial representation of the invention shown in the environment of the harvesting of fruit from lyre trellises. Here Bo Peep rods (or other shape shaker rods) 170 are carried from a pair of posts such as 172a and 172b which are each pivotally mounted on an axle 174, either independently or dependently. The axle 174 will be attached to the shaker head module 22 by a bracket means 176. The shaker will still operate side-to-side but by having the posts pivotally mounted the shaker bars or rods can pivot up and over the trellis cross bar 178 then drop down between trellises to get exposure to more of the vine foliage.

The full pivotal action provided by the axle 174 can be overridden by locking it in place or dampening its pivotability or having a limit stop to prevent it from going too low after passing over the cross bar of the trellis.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the spirit and scope of the invention.

What is claimed is:

1. A harvester for harvesting product suspended on an above ground plant, comprising:
    a frame;
    a shaker head support structure mounted to the frame; and a shaker head mounted to the support structure;
    the support structure defining a substantially linear horizontal path of movement for the shaker head, which is lateral to a direction of travel for the harvester;
    the shaker head being movable relative to the support structure in directions limited to the substantially linear horizontal path.

2. The harvester in accordance with claim 1, wherein said support structure includes a pair of transverse rods defining the path of movement, said transverse rods supporting said shaker head thereon.

3. The harvester in accordance with claim 2 wherein said force balance shaker includes at least two weight sets having rotational centers, said rotational centers defining a vertical plane perpendicular to said transverse rods, said weight sets mounted for rotation on said rotational centers in directions opposite each other and rotating at the same frequency.

4. The harvester in accordance with claim 3 wherein said weight sets generate forces which are aligned with each other when the center of mass relative to said center of rotation of each weight of said weight sets are perpendicular to said pair of transverse rods.

5. The harvester in accordance with claim 4 wherein said forces are aligned twice per rotational cycle of said weight sets.

6. The harvester in accordance with claim 5 further comprising two C-arms attached to said shaker head, said C-arms supporting a striker bar on each arm, said striker bars restricted for movement in a plane parallel to the movement of said shaker head and parallel to said transverse bars.

7. The harvester in accordance with claim 5 wherein at least one post is attached to said shaker head, said post descending from said shaker head and fixed to move with said shaker head.

8. The harvester in accordance with claim 7 further comprising a plurality of crop contacting rods attached to said post.

9. The harvester in accordance with claim 8 wherein said rods are attached to more than one post descending from said shaker head.

10. A harvester for use in harvesting a crop, comprising:
    a frame;
    a shaker head support structure mounted to the frame; and
    a shaker head mounted to the support structure and including a force balanced shaker having a set of weights including two weight sets having rotational centers, said weight sets mounted for rotation on said rotational centers in directions opposite each other and rotating at the same frequency; and at least a single crop contacting member carried by said shaker head;

the support structure defining a substantially linear horizontal path of movement for the shaker head, which is lateral to a direction of movement for the harvester;

the shaker head movable relative to the support structure in directions limited to the substantially linear horizontal path.

11. The harvester in accordance with claim 10 wherein the shaker head comprises a shaker head module;

and the support structure comprises at least one transverse rod oriented in the path of movement;

the shaker head module carried on said transverse rod and restrained by said transverse rod to movement in the path of movement;

the harvester further comprising at least a single crop contacting member carried by said shaker head module in the path of movement.

12. The harvester in accordance with claim 11 further comprising two C-arms attached to said shaker head module, said C-arms supporting a striker bar on each arm.

13. The harvester in accordance with claim 11 further comprising at least one post attached to said shaker head module, said post descending from said shaker head and fixed to said shaker head.

14. The harvester in accordance with claim 13 further comprising a plurality of crop contacting rods attached to said post.

15. The harvester in accordance with claim 14 wherein said rods are attached to more than one post descending from said shaker head.

16. A method of striking the trunk of a plant being harvested or the foliage of a plant being harvested by the use of a harvester, said harvester including a shaker head constrained to substantially horizontal movement through an attachment to said harvester on a pair of transverse rods in directions lateral to a movement of the harvester, said method comprising the steps of:

imparting a force generated by the substantially horizontal movement of said shaker head to said plant only from a first direction generally perpendicular to a major vertical axis of the plant and lateral to the movement of the harvester;

imparting an equal force to said plant only from a second direction opposite the direction of said first force after the application of said first force, said second force generally perpendicular to the major vertical axis of the plant and lateral to the movement of the harvester.

17. The method in accordance with claim 16 wherein the steps of imparting a force are repeated at a frequency sufficient to cause the removal of fruit from said plant.

18. The method in accordance with claim 17 further comprising two C-arms attached to said shaker head module, said C-arms supporting a striker bar on each arm, said striker bar contacting said trunk to impart said force to said trunk.

19. The method in accordance with claim 17 wherein at least one post is attached to said shaker head module, said post descending from said shaker head and fixed to said shaker head.

20. The method in accordance with claim 19 wherein a plurality of crop contacting rods are attached to said post and said rods are positioned for contacting said foliage of said plant being harvested.

* * * * *